(12) United States Patent
Kim (10) Patent No.: US 10,913,080 B2
(45) Date of Patent: Feb. 9, 2021

(54) PORTABLE SPRAY DEVICE

(71) Applicant: WINBEES CO., LTD., Ansan-si (KR)

(72) Inventor: Soohyun Kim, Yangju-si (KR)

(73) Assignee: WINBEES CO., LTD., Ansan-si (KR)

( * ) Notice: Subject to any disclaimer, the term of this patent is extended or adjusted under 35 U.S.C. 154(b) by 106 days.

(21) Appl. No.: 16/222,604

(22) Filed: Dec. 17, 2018

(65) Prior Publication Data

US 2019/0118193 A1 Apr. 25, 2019

Related U.S. Application Data

(63) Continuation of application No. PCT/KR2016/012177, filed on Oct. 27, 2016.

(30) Foreign Application Priority Data

Jun. 17, 2016 (KR) ........................ 10-2016-0076041

(51) Int. Cl.
| | |
|---|---|
| *B05B 5/00* | (2006.01) |
| *B05B 5/04* | (2006.01) |
| *B65D 25/40* | (2006.01) |
| *B65D 83/06* | (2006.01) |
| *A23G 3/28* | (2006.01) |
| *B05B 3/08* | (2006.01) |
| *B05B 7/14* | (2006.01) |
| *B05B 1/00* | (2006.01) |
| *B44C 1/00* | (2006.01) |
| *B05B 1/30* | (2006.01) |

(52) U.S. Cl.
CPC .............. *B05B 5/0418* (2013.01); *A23G 3/28* (2013.01); *B05B 1/00* (2013.01); *B05B 3/08* (2013.01); *B05B 7/1422* (2013.01); *B44C 1/00* (2013.01); *B65D 25/40* (2013.01); *B65D 83/06* (2013.01); *B05B 1/3053* (2013.01)

(58) Field of Classification Search
CPC ............ B05B 3/08; B05B 5/0418; A23G 3/28
USPC ........ 239/302, 325; 222/137, 233, 236, 240; 415/72
See application file for complete search history.

(56) References Cited

U.S. PATENT DOCUMENTS 5,062,573 A * 11/1991 Makimura ......... F02M 51/0675
239/533.12
5,071,040 A * 12/1991 Laptewicz, Jr. .. B01F 15/00681
222/235
(Continued)

FOREIGN PATENT DOCUMENTS

JP S63-100976 A 5/1988
JP 3002262 U 9/1994
(Continued)

OTHER PUBLICATIONS

International Search Report issued in PCT/KR2016/012177; dated Mar. 24, 2017.
(Continued)

*Primary Examiner* — Viet Le
(74) *Attorney, Agent, or Firm* — Studebaker & Brackett PC (57) ABSTRACT

The present invention relates to a portable spay device and, more specifically, to a portable spray device moving a cartridge member by means of a simple rotational motion of a spray rotating body, thereby enabling powder positioned inside the cartridge member to be effectively sprayed to the outside.

18 Claims, 6 Drawing Sheets

(56) References Cited

U.S. PATENT DOCUMENTS

| | | | | |
|---|---|---|---|---|
| 5,242,234 | A * | 9/1993 | Ahrens | B05B 11/0035 |
| | | | | 401/134 |
| 6,699,214 | B2 * | 3/2004 | Gellman | A61M 5/2066 |
| | | | | 604/187 |
| 6,851,923 | B1 * | 2/2005 | Fugere | B05C 11/10 |
| | | | | 222/413 |
| 7,014,640 | B2 * | 3/2006 | Kemppainen | A61B 17/8822 |
| | | | | 606/86 R |
| 7,178,745 | B1 * | 2/2007 | Fugere | B05C 5/0225 |
| | | | | 239/302 |
| 7,922,044 | B2 * | 4/2011 | Luchinger | G01F 13/001 |
| | | | | 222/344 |
| 8,308,681 | B2 * | 11/2012 | Slocum | A61B 17/00491 |
| | | | | 604/82 |
| 9,067,011 | B2 * | 6/2015 | Zou | A61M 5/14276 |
| 2004/0050873 | A1 * | 3/2004 | Vohwinkel | G01G 13/026 |
| | | | | 222/233 |
| 2006/0283975 | A1 * | 12/2006 | Muir | A23G 1/042 |
| | | | | 239/146 |
| 2007/0213659 | A1 * | 9/2007 | Trovato | A61M 5/1723 |
| | | | | 604/67 |
| 2019/0118193 | A1 * | 4/2019 | Kim | B05B 5/0418 |

FOREIGN PATENT DOCUMENTS

| | | |
|---|---|---|
| JP | 2002-096882 A | 4/2002 |
| JP | 2003-129670 A | 5/2003 |
| JP | 2006-289259 A | 10/2006 |
| JP | 3942708 B2 | 7/2007 |
| JP | 2009-297623 A | 12/2009 |
| JP | 3192987 U | 9/2014 |
| KR | 1998-032371 U | 9/1998 |
| KR | 20-0219549 Y1 | 4/2001 |
| KR | 10-2010-0124515 A | 11/2010 |
| KR | 10-2011-0070203 A | 6/2011 |
| KR | 10-2013-0108728 A | 10/2013 |
| KR | 10-2015-0068558 A | 6/2015 |

OTHER PUBLICATIONS

An Office Action mailed by the Japanese Patent Office dated Nov. 5, 2019, which corresponds to Japanese Patent Application No. 2019-518912 and is related to U.S. Appl. No. 16/222,604.

* cited by examiner

PORTABLE SPRAY DEVICE

This application is a continuation application of PCT International Application No. PCT/KR2016/012177 filed Oct. 27, 2016, which claims priority from Korean Patent Application No. 10-2016-0076041, filed on Jun. 17, 2016 in the Korean Intellectual Property Office, the disclosures of which are incorporated herein in their entirety by reference.

TECHNICAL FIELD

The present invention relates to a portable spray device, and more particularly, a portable spray device capable of effectively spraying powder placed in a cartridge member to the outside by moving the cartridge member through simple rotational movement of a spraying rotor.

BACKGROUND ART

Recently, an interest in food is increasing and additionally an interest in a skill and a method of decorating food is also increasing. As an example of decorating food, how to draw letters or patterns on a cake and the like is commonly known. As a method of drawing letters, patterns, or the like on a cake or the like, a method of holding and gripping a tube, in which liquid cream, liquid chocolate, or the like having high viscosity is inserted, to squeeze a liquid material therein toward an end of the tube is generally used.

Although liquid chocolate, dressing, and the like with high viscosity are used as a material for decorating food, recently decorating food has been gradually increased to include decorating food using a powder material.

Particularly, a decoration method of forming letters, patterns, or the like using a powder material such as cinnamon powder or the like on the basis of skills of milk steaming, latte art, chocolate art, variation coffee, and the like is generally used.

However, since it is impossible to use a powder material with a conventional tube type decoration tool and a spray amount is determined by a pressure of gripping a tube by a user, in the case of an unskilled user, it is difficult to form letters or patterns by adjusting a spray amount.

Also, Korean Patent Publication No. 2015-0068558 discloses a tool for decorating a beverage in which a paper or plastic sheet carved with a pattern or a letter is fixed to a cup or glass and then powder of a green tea mixture or the like is sprinkled on the paper or plastic so as to form the letter or image on a surface of the beverage.

However, the tool for decorating a beverage disclosed in Korean Patent Publication No. 2015-0068588 has a problem in which only a determined letter or a pattern formed in a paper or plastic sheet is usable instead of creatively forming a letter or a pattern desired by a user.

Also, since it is necessary to sprinkle powder over a paper or plastic sheet to cover a letter or an image thereof entirely, an amount of wasted powder on another part of the paper or plastic sheet is large and it is difficult to precisely form a pattern or a letter formed on a surface of a beverage with a uniform thickness.

Technical Problem

The present invention is directed to providing a portable spray device capable of uniformly spraying powder type materials in addition to liquid materials.

The present invention is also directed to providing a portable spray device capable of effectively ejecting powder placed in a cartridge member to the outside by moving the cartridge member through simple rotational movement of a spraying rotor.

The present invention is also directed to providing a portable spray device capable of freely forming a letter, a pattern, or the like desired by a user on a surface of a beverage such as coffee and the like in addition to food to decorate by easily and uniformly spraying a powder type material.

Technical Solution

One aspect of the present invention provides a portable spray device including a body casing member, a spray nozzle member which is provided at a front end part of the body casing member and includes a spray hole for spraying a powder material, a cartridge member which is located in the body casing member and discharges a stored powder material through an outlet and supplies the stored powder material to an inside of the spray nozzle member, and a spraying rotor which is disposed in the spray nozzle member and sprays the powder material through the spray hole through rotation thereof.

The spraying rotor may collide with the cartridge member at least once during a single rotation and may move the cartridge member.

The movement of the cartridge member may include at least one of upward and downward movement, leftward and rightward movement, regular or irregular movement, and diagonal movement.

The outlet may be disposed at a front end part of the cartridge member, and the cartridge member may be moved in a longitudinal direction.

The spraying rotor may include a rotational shaft portion which receives a rotating force and rotates and a spiral protrusion portion which spirally protrudes from an outer circumferential surface of the rotational shaft portion.

The spraying rotor may further include a cartridge-colliding protrusion portion which protrudes from the rotational shaft portion and collides with the cartridge member.

A cartridge protrusion portion, which collides with the cartridge-colliding protrusion portion, may protrude from a front end part of the cartridge member.

The rotational shaft portion may have a conical shape having a diameter gradually decreasing toward a front end part. Also, the spiral protrusion portion may include a plurality of material-moving groove portions spaced apart from each other.

The spiral protrusion portion may have a shape in which a plurality of spiral protrusions are spaced apart from each other and an interval is formed therebetween.

The portable spray device may further include a linear movement guide member which guides the movement of the cartridge member.

The portable spray device may further include a cartridge-supporting spring member which elastically supports the cartridge member.

The body casing member may include a rotating motor rotating the spraying rotor, an inner casing portion in which an operation control portion controlling an operation of the rotating motor is mounted, and an outer casing portion in which the inner casing portion is disposed. Also, the linear movement guide member may include a main linear moving body provided at any one of a first surface of the inner casing portion facing the cartridge member and a second surface of the cartridge member facing the inner casing portion and include a main linear movement guide rail provided at the other of the first surface and the second surface and with which the main linear moving body is combined to be linearly movable.

The portable spray device may further include a cartridge-supporting spring member which elastically supports the cartridge member. The cartridge-supporting spring member may be provided in the main linear movement guide rail and may elastically support the cartridge member.

The linear movement guide member may further include a movement guide protrusion portion which protrudes from any one of the first surface and the second surface, and a movement guide slit groove portion which is provided at any one of the first surface and the second surface, into which the movement guide protrusion portion is inserted, and which is disposed in a longitudinal direction of the body casing member.

The body casing member may include a rotating motor rotating the spraying rotor, an inner casing portion in which an operation control portion controlling an operation of the rotating motor is mounted, and an outer casing portion in which the inner casing portion is disposed. Also, any one of the inner casing portion and the outer casing portion may slide toward the other and be combined therewith.

The portable spray device may further include a funnel member which fills the inside of the cartridge member with a powder material.

The portable spray device may further include a spray hole opening or closing member which opens or closes the spray hole.

The spray hole opening or closing member may include an electromagnet portion provided at a front end part of the spraying rotor, a spray hole stopper portion which is moved by a magnetic force of the electromagnet portion and opens or closes the spray hole, a stopper-supporting spring member which elastically supports the spray hole stopper portion to block the spray hole, and a stopper movement guide portion which guides movement of the spray hole stopper portion.

The electromagnet portion may receive electrical power when the rotating motor is operated and generate a magnetic force to open the spray hole, and electrical power supply may be blocked when the rotating motor is stopped.

Advantageous Effects

According to the present invention, since it is possible to uniformly spray a powder material without a clog through rotation of a screw included in a nozzle, effects of using the material without a problem caused by clogging of the material and significantly increasing convenience in use are present.

According to the present invention, since it is possible to freely express and easily decorate letters, patterns, or the like, which are desired by a user, not only on food but also a drink such as coffee and the like by smoothly and uniformly spraying a powder material without a cog, effects of maximizing expressiveness of the user and increasing expressiveness and aesthetic effects of decorating letters or patterns are present.

MODES OF THE INVENTION

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

It will be understood that the terms "comprise" and/or "comprising" when used herein, specify some stated components, steps, operations and/or elements, but do not preclude the presence or addition of one or more other components, steps, operations and/or elements.

Figure 1:
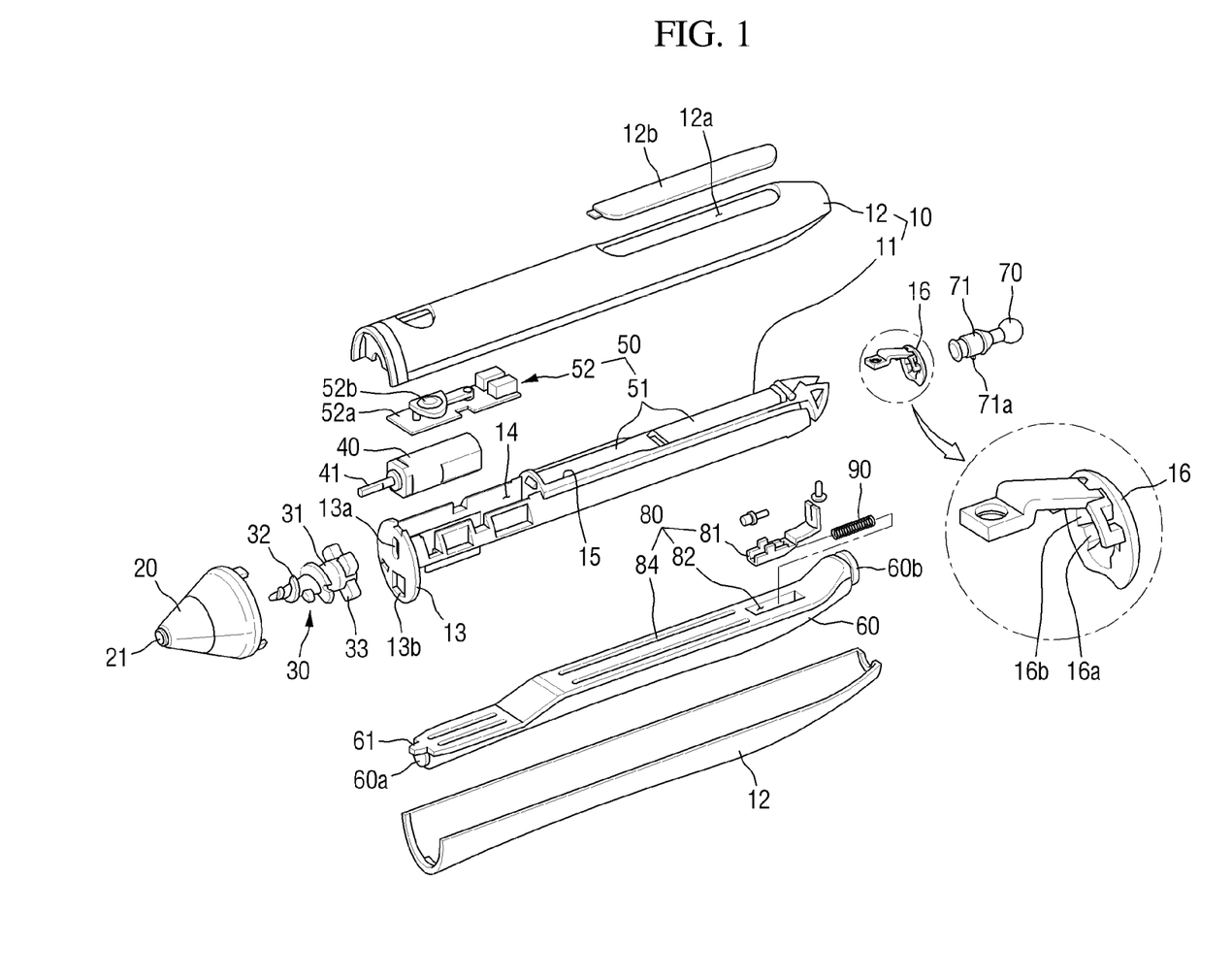
FIG. 1 is an exploded perspective view illustrating one embodiment of a portable spray device according to the present invention.
Figure 2:
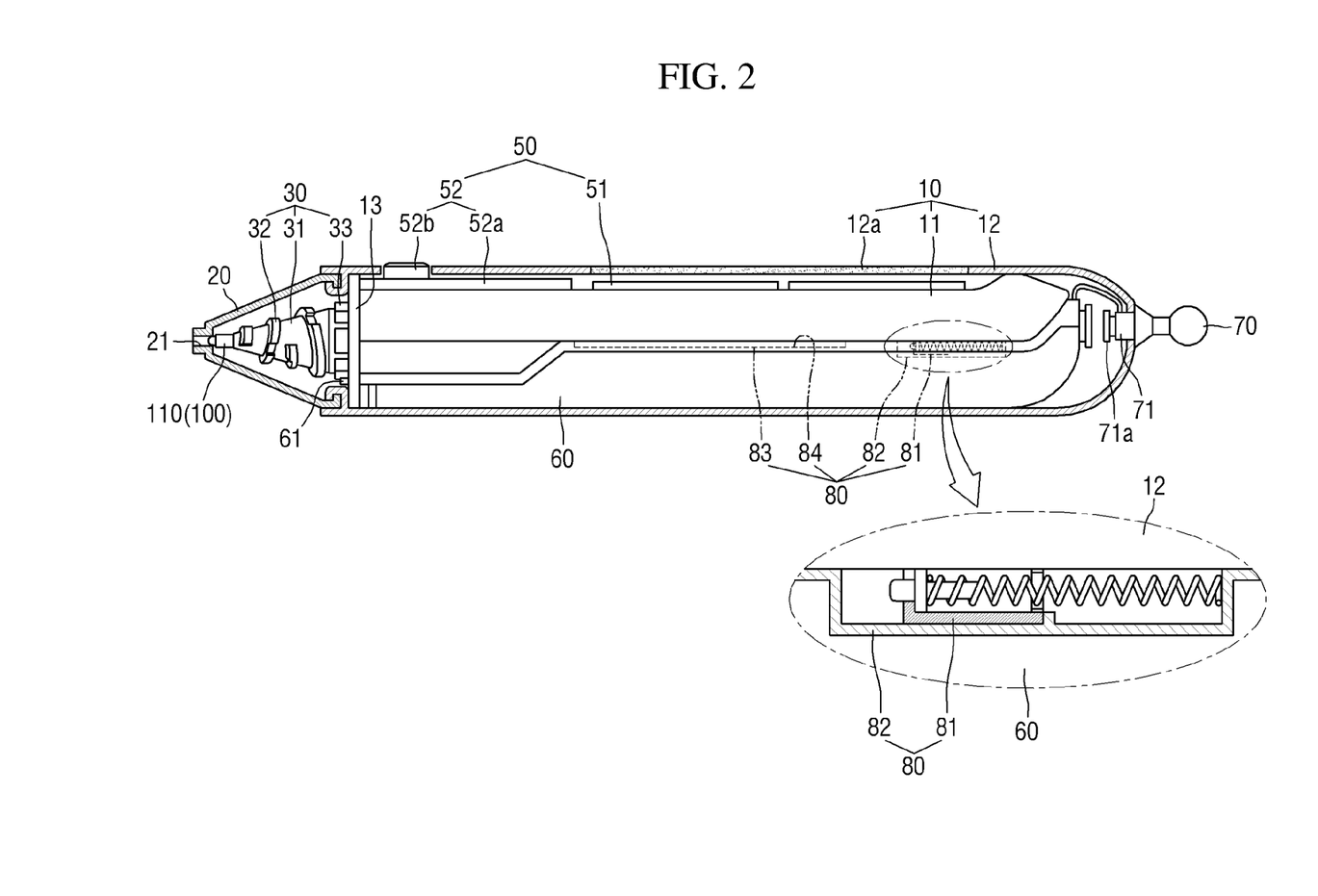
FIG. 2 is a cross-sectional view illustrating one embodiment of the portable spray device according to the present invention.
Figure 3:
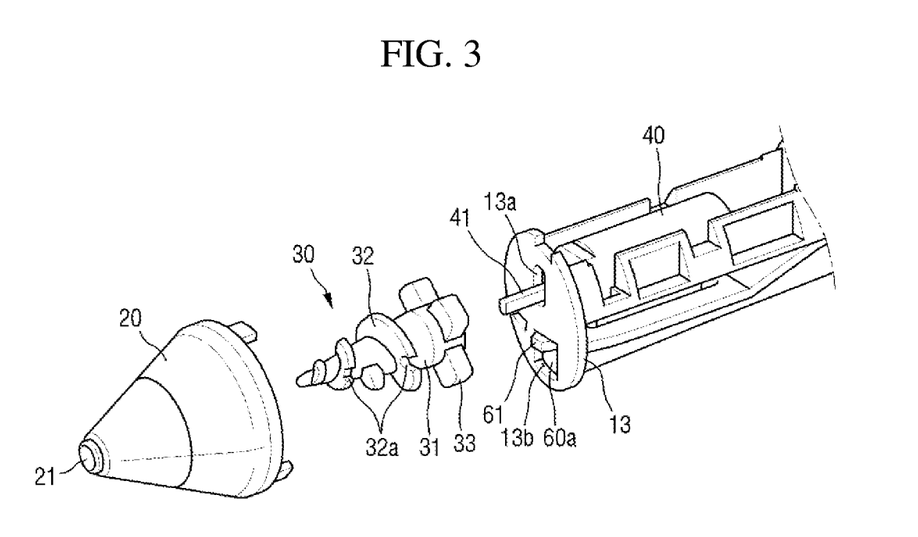
FIG. 3 is an enlarged perspective view of a significant part of the portable spray device according to the present invention.

FIG. 1 is an exploded perspective view illustrating one embodiment of a portable spray device according to the present invention, FIG. 2 is a cross-sectional view illustrating one embodiment of the portable spray device according to the present invention, and FIG. 3 is an enlarged perspective view illustrating a spraying rotor 30 of the portable spray device according to the present invention.

Referring to FIGS. 1 to 3, one embodiment of the portable spray device according to the present invention will be described below in detail. The portable spray device according to the present invention includes a body casing member 10 securing an installation space therein.

The body casing member 10 includes an inner casing portion 11 in which a rotating motor 40 and an operation control portion 50 are mounted and which guides movement of a cartridge member 60 and an outer casing portion 12 in which the inner casing portion 11 is disposed.

It should be noted that the outer casing portion 12 has, for example, a cylindrical shape and may be modified into any shape capable of securing a space for allowing the inner casing portion 11 to be disposed therein and being easily gripped by a hand of a user to be used.

The inner casing portion 11 is shown as being manufactured separately from the outer casing portion 12 and assembled in the outer casing portion 12 but may be formed integrally with the outer casing portion 12 to protrude from an inner circumferential surface of the outer casing portion 12.

The outer casing portion 12 is separated into two bodies, and the inner casing portion 11 is assembled with an inside of the outer casing portion 12 formed by combining the two bodies as an example.

Although not shown in the drawings, any one of the inner casing portion 11 and the outer casing portion 12 may be slid toward the other and combined with the other.

That is, any one of the inner casing portion 11 and the outer casing portion 12 includes a rail for slide coupling, and the other thereof includes a sliding body combined with the rail for slide coupling such that the inner casing portion 11 and the outer casing portion 12 may be assembled with each other in a sliding manner.

A spray nozzle member 20 including a spray hole 21 for spraying a powder material is combined with a front end part of the body casing member 10, that is, a front end part of the outer casing portion 12.

The spray nozzle member 20 has a conical shape with a diameter which becomes gradually smaller toward a front end part thereof and includes the spray hole 21 provided at the front end part as an example.

The spraying rotor 30 which sprays the powder material through the spray hole 21 is rotatably disposed in the spray nozzle member 20.

The spraying rotor 30 is combined with a motor shaft 41 of the rotating motor 40 mounted in the body casing member 10 and rotates with the motor shaft 41.

The operation control portion 50 which controls an operation of the rotating motor 40 may be mounted in the body casing member 10.

The operation control portion 50 includes a power supply portion 51 which supplies electric power to the rotating motor 40 and a switch portion 52 which is electrically connected to the power supply portion 51 and the rotating motor 40 and supplies electrical power from the power supply portion 51 to the rotating motor 40 or blocks the electrical power.

The switch portion 52 may include a substrate 52a including a circuit capable of controlling the operation of the rotating motor 40 and a switch 52b which is provided on the substrate 52a and applies a signal for operating or stopping the rotating motor 40.

The power supply portion 51 is, for example, a battery or a rechargeable battery, of which the battery replaceable is used in the present invention, and may include a wire and a plug, which is not shown, capable of being combined with an electrical outlet for power supply.

A front portion 13 of the body casing member 10 may include a shaft through hole 13a and a discharge through hole 13b through which a cartridge protrusion portion 61 protruding from a front end part of the cartridge member 60 passes and which communicates with an outlet 60a of the cartridge member 60.

That is, the inner casing portion 11 includes the front portion 13, a motor mounting space portion 14 which is provided in the rear of the front portion 13, in which the rotating motor 40 is inserted and mounted, and which communicates with the shaft through hole 13a, and a battery insertion portion 15 which is provided in the rear of the motor mounting space portion 14 and supplies electrical power to the rotating motor 40.

The outer casing portion 12 may include a battery replacement open portion 12a which exposes the battery insertion portion 15 and a battery cover portion 12b which covers and is detachably coupled with the battery replacement open portion 12a.

When the battery cover portion 12b is separated from the outer casing portion 12, a battery inserted in the battery insertion portion is exposed through the battery replacement open portion 12a such that the battery may be easily replaced.

The cartridge member 60 is mounted in the body casing member 10. A powder material is stored in the cartridge member 60. An outlet 60a which supplies the powder material to the spraying rotor 30 is provided at the front end part of the cartridge member 60.

The spraying rotor 30 collides with the cartridge member 60 at least once during a single rotation so as to repeatedly move the cartridge member 60 in the body casing member 10 such that the powder material in the cartridge member 60 is more easily moved toward the outlet 60a and is more easily discharged through the outlet 60a.

As an example, movement of the cartridge member 60 includes at least one of upward and downward movement, leftward and rightward movement, regular or irregular movement, and diagonal movement.

As an example, the cartridge member 60 is disposed in a longitudinal direction of the outer casing portion 12 such that a part of an outer surface thereof comes into close contact with a part of an outer surface of the inner casing portion 11.

The cartridge protrusion portion 61, which collides with the spraying rotor 30 during rotation of the spraying rotor 30, may be provided to protrude from the front end part of the cartridge member 60, and a material supply hole 60b, through which the powder material may be supplied to an inside thereof, may be provided at a rear end of the cartridge member 60.

A supply hole exposure hole 16a, which exposes the material supply hole 60b, is provided at a rear end part of the body casing member 10, and a stopper member 70 is detachably coupled with the supply hole exposure hole 16a.

As an example, a stopper-combining flange portion 16 including the supply hole exposure hole 16a is provided at a rear end of the inner casing portion 11 and is disposed to be exposed at a rear of the outer casing portion 12.

A stopper-combining portion 71 passing through the supply hole exposure hole 16a protrudes from an end part of the stopper member 70, and a plurality of combination protrusions 71a are provided on an outer circumferential surface of the stopper-combining portion 71.

Also, a combination groove portion 16b, through which the combination protrusion 71a passes, is provided on an inner circumferential surface of the supply hole exposure hole 16a.

The stopper member 70 passes and then rotates the combination protrusion 71a of the stopper-combining portion 71 through the combination groove portion 16b such that the combination protrusion 71a is held by the inner circumferential surface of the supply hole exposure hole 16a for the stopper member 70 to be combined with the stopper-combining flange portion 16 and block the material supply hole 60b.

Also, while the stopper member 70 is turned such that the combination protrusion 71a coincides with the combination groove portion 16b, the stopper member 70 is pulled and easily separated from the stopper-combining flange portion 16 so as to open the supply hole exposure hole 16a such that the cartridge member 60 may be refilled with the powder material by supplying the powder material thereto through the material supply hole 60b.

Meanwhile, the spraying rotor 30 includes a rotational shaft portion 31, which receives a rotation force of the rotating motor 40 and rotates and includes a spiral protrusion portion 32, which spirally protrudes from an outer circumferential surface of the rotational shaft portion 31 and may further include a cartridge-colliding protrusion portion 33 which protrudes from the rotational shaft portion 31 and collides with the cartridge member 60.

As an example, the rotational shaft portion 31 has a conical shape having a diameter decreasing toward a front end part thereof.

Also, the spiral protrusion portion 32 may include a plurality of material-movement groove portions 32a spaced apart from each other.

Also, the spiral protrusion portion 32 may have a shape in which a plurality of spiral protrusions are spaced apart from each other and an interval is formed therebetween.

The material-movement groove portion 32a allows the powder material to easily move toward the spray hole 21 in the spray nozzle member 20 through rotation of the spraying rotor 30.

Also, the spiral protrusion portion 32 includes the plurality of spiral protrusions and the interval between the spiral protrusions such that the powder material may be easily moved toward the spray hole 21 in the spray nozzle member 20 through the rotation of the spraying rotor 30.

As an example, the cartridge-colliding protrusion portion 33 protrudes from a rear end part of the rotational shaft portion 31 and collides with the front end part of the cartridge member 60. A plurality of such cartridge-colliding protrusion portions 33 protrude to be spaced apart from each other along an outer perimeter of the rotational shaft portion 31 and collide with the cartridge member 60 a plurality of times during a single rotation of the rotational shaft portion 31 to generate vibration in the cartridge member 60.

The cartridge-colliding protrusion portion 33 collides with the cartridge protrusion portion 61 protruding from the front end part of the cartridge member 60, and the cartridge protrusion portion 61 is disposed at a position to protrude toward the front surface of the front portion 13 through the discharge through hole 13b of the front portion 13 and to collide with the cartridge-colliding protrusion portion 33.

As an example, the cartridge member 60 is movably disposed in a longitudinal direction of the body casing member 10 and is pushed and moved in the longitudinal direction when colliding with the cartridge-colliding protrusion portion 33.

The portable spray device according to the present invention may further include a linear movement guide member 80 which guides linear movement of the cartridge member 60.

Also, the portable spray device according to the present invention may further include a cartridge-supporting spring member 90 which elastically supports the cartridge member 60.

The cartridge-supporting spring member 90 elastically supports the cartridge member 60 such that the front end part of the cartridge member 60 collides with the spraying rotor 30 and, more particularly, allows the cartridge protrusion portion 61 to return to a position at which the cartridge protrusion portion 61 protrudes through the discharge through hole 13b and collides with the cartridge-colliding protrusion portion 33.

Since the outlet 60a is disposed to face the front end part of the cartridge member 60 and the cartridge member 60 is disposed in the longitudinal direction of the body casing member 10, when the cartridge member 60 precisely performs linear movement in the longitudinal direction of the body casing member 10, the powder material therein may be most efficiently and easily discharged through the outlet 60a.

When the cartridge member 60 collides with the spraying rotor 30 and movement occurs in a leftward or rightward direction, a force of moving the powder material to the outlet 60a of the front end part in the cartridge member 60 is dispersed such that the powder material does not easily move toward the outlet 60a.

Also, when the cartridge member 60 moves leftward or rightward, the outlet 60a of the cartridge member 60 deviates from the discharge through hole 13b such that the powder material may be held by the front portion 13 and remain in the outer casing portion 12.

When the material storing cartridge collides with the spraying rotor 30, the linear movement guide member 80 guides linear reciprocal movement of the cartridge member 60 and linearly concentrates a force of moving the powder material from an inside of the cartridge member 60 to the outlet 60a at the front end part of the cartridge member 60 so as to easily discharge the powder material through the outlet 60a.

Also, the linear movement guide member 80 guides the linear reciprocal movement of the cartridge member 60 such that the powder material may not scatter when being discharged through the outlet 60a and the entire quantity of discharged powder material may be supplied to the inside of the spray nozzle member 20 through the discharge through hole 13b.

The cartridge-colliding protrusion portion 33 and the cartridge protrusion portion 61 have curved colliding parts which collide with each other such that the cartridge member 60 is easily pushed and moved by a collision between the cartridge-colliding protrusion portion 33 and the cartridge protrusion portion 61 in a longitudinal direction, that is, toward a rear end part, and the cartridge-colliding protrusion portion 33 is held by the cartridge protrusion portion 61 and the spraying rotor 30 is easily rotated without stopping.

As an example, at least a part of an outer surface of the cartridge member 60 comes into contact with a part of an outer surface of the inner casing portion 11 such that movement of the part is guided in a longitudinal direction.

The linear movement guide member 80 includes a main linear moving body 81 provided at any one of a first surface of the inner casing portion 11 facing the cartridge member 60 and a second surface of the cartridge member 60 facing the inner casing portion 11 and includes a main linear movement guide rail 82 provided at the other of the first surface and the second surface and with which the main linear moving body 81 is combined to be linearly movable.

As an example, the cartridge-supporting spring member 90 is included in the main linear movement guide rail 82 such that one end thereof is supported by the main linear moving body 81 and the other end is supported by the cartridge member 60.

The cartridge-supporting spring member 90 is included in the main linear movement guide rail 82 to elastically support the cartridge member 60 and guide the cartridge member 60 to linearly reciprocate at the same time.

Also, the linear movement guide member 80 may further include a movement guide protrusion portion 83 protruding from any one of the first surface and the second surface and a movement guide slit groove portion 84 which is provided at any one of the first surface and the second surface, into which the movement guide protrusion portion 83 is inserted, which is disposed in a longitudinal direction of the body casing member 10.

When the cartridge-colliding protrusion portion 33 collides with the cartridge protrusion portion 61 due to rotation of the spraying rotor 30, the main linear moving body 81 moves along the main linear movement guide rail 82 and the movement guide protrusion portion 83 moves along the movement guide slit groove portion 84 such that the cartridge member 60 precisely performs linearly reciprocal movement.

The spraying rotor 30 is rotated by the rotating motor 40 and moves the powder material to the spray hole 21 between the spiral protrusion portion 32 so as to discharge the powder material through the spray hole 21 and simultaneously, repeatedly collides the cartridge-colliding protrusion portion 33 with the cartridge protrusion portion 61 so as to allow the cartridge member 60 to perform linearly reciprocal movement in an upward or downward direction, that is, in the longitudinal direction of the body housing portion opposite to the outlet 60a.

As the spraying rotor 30 rotates, the cartridge member 60 reciprocally moves in a direction opposite the front end part, that is, the front end part where the outlet 60a is provided such that the powder material therein is easily discharged through the outlet 60a and is supplied to an inside of the spray nozzle member 20.

Also, the powder material discharged from the cartridge member 60 and supplied to an inside of the spray nozzle member 20 is moved to the spray hole 21 by the spiral protrusion portion 32 and is easily sprayed through the spray hole 21.

Meanwhile, the portable spray device according to the present invention may further include a spray hole opening or closing member 100 which opens or closes the spray hole 21.

The spray hole opening or closing member 100 blocks the spray hole 21 when not in use and opens the spray hole 21 such that the powder material is sprayed through the spray hole 21 when the spraying rotor 30 is rotated, that is, in use.

As an example, the spray hole opening or closing member 100 opens the spray hole 21 using a pressurizing force caused by rotation of the spraying rotor 30 with a valve plate 110 formed of an elastic material and blocks the spray hole 21 using self-same elastic force thereof when the spraying rotor 30 is stopped.

Figure 4:
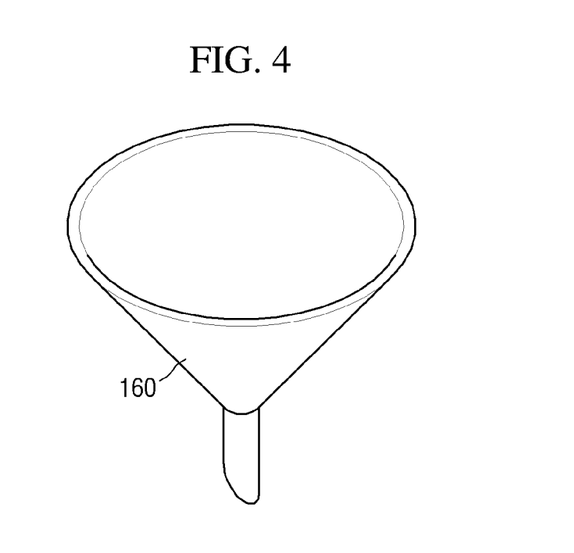
FIG. 4 is a perspective view illustrating a funnel member of the portable spray device according to the present invention.

Also, FIG. 4 is a perspective view illustrating a funnel member of the portable spray device according to the present invention. Referring to FIG. 4, a funnel member 160 for filling the inside of the cartridge member 60 with the powder material is further included.

The funnel member 160 allows the cartridge member 60 to be refilled with the powder material through the material supply hole 60b so as to drastically increase convenience in refilling the cartridge member 60 with the powder material.

Figure 5:
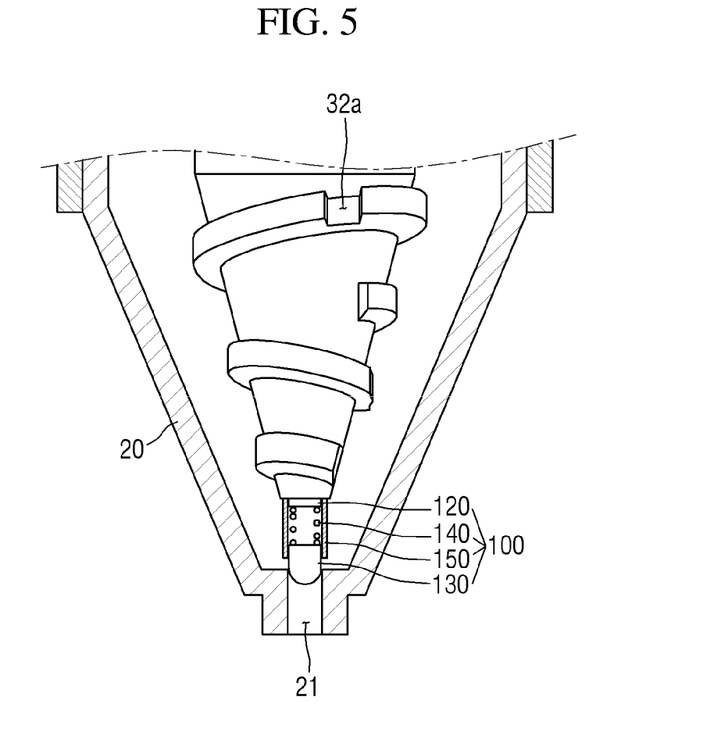
FIGS. 5 and 6 are enlarged cross-sectional views illustrating an inside of a spray nozzle member in the portable spray device according to the present invention.
Figure 6:
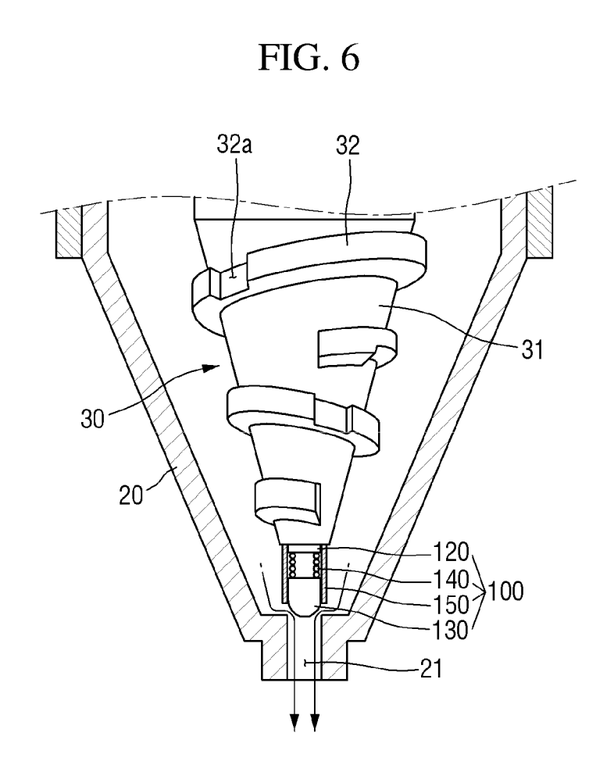

FIGS. 5 and 6 are enlarged cross-sectional views illustrating the inside of the spray nozzle member 20 according to the present invention. Here, the spray hole opening or closing member 100 includes an electromagnet portion 120 provided at a front end part of the spraying rotor 30, a spray hole stopper portion 130 which is moved by a magnetic force of the electromagnet portion 120 and opens or closes the spray hole 21, a stopper-supporting spring member 140 which elastically supports the spray hole stopper portion 130 to block the spray hole 21, and a stopper movement guide portion 150 which guides movement of the spray hole stopper portion 130.

As an example, the stopper movement guide portion 150 is integrally provided at the front end part of the spraying rotor 30 and is opened toward the front end such that the electromagnet portion 120, the stopper-supporting spring member 140, and the spray hole stopper portion 130 are inserted therein.

As an example, the spray hole stopper portion 130 is a magnetic body moved toward the electromagnet portion 120 when the electromagnet portion 120 generates a magnetic force. The stopper-supporting spring member 140 elastically supports the spray hole stopper portion 130 to block the spray hole 21 and allows the spray hole stopper portion 130 to block the spray hole 21 again when the magnetic force of the electromagnet portion 120 is removed.

The electromagnet portion 120 is connected to the operation control portion 50 and receives electrical power and generates a magnetic force when the electrical power is supplied to the rotating motor 40 through the switch portion 52 and the spraying rotor 30 is rotated.

That is, when a user pushes the switch portion 52 and rotates the rotating motor 40, a magnetic force is generated in the electromagnet portion 120 such that the spray hole stopper portion 130 moves toward the electromagnet portion 120 and opens the spray hole 21.

Also, due to the rotation of the spraying rotor 30, the powder material which the spray nozzle member 20 is filled with is moved toward the front end part of the spray nozzle member 20, that is, toward the spray hole 21, by the spiral protrusion portion 32 and is easily sprayed through the spray hole 21.

Also, when the user pushes the switch portion 52 again and stops the rotating motor 40, power supply of the electromagnet portion 120 is blocked and the magnetic force is removed in the electromagnet portion 120 such that the spray hole stopper portion 130 blocks the spray hole 21 again due to an elastic force of the stopper-supporting spring member 140.

Figure 7:
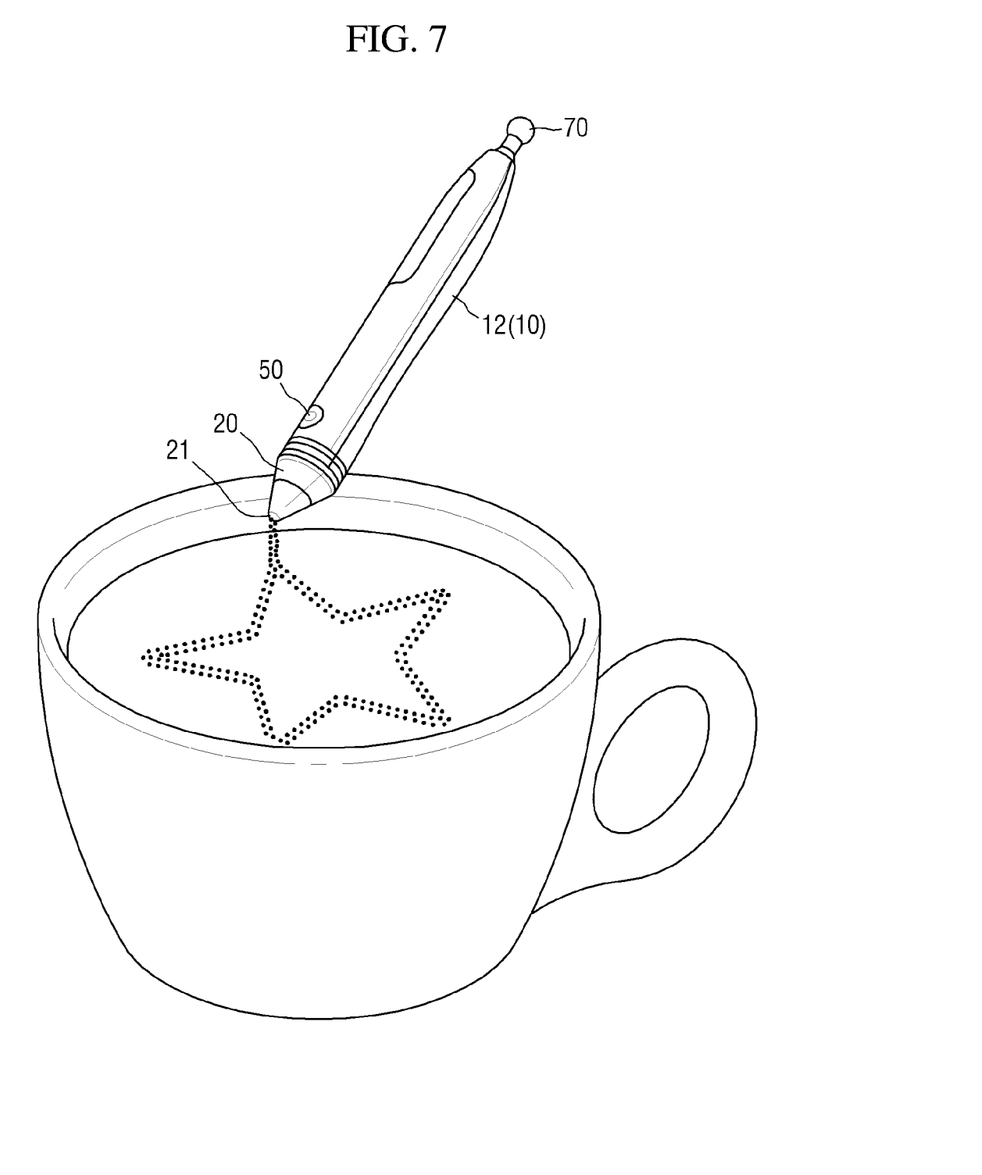
FIG. 7 is a use state view of the portable spray device according to the present invention.

FIG. 7 is a view illustrating a state of using the portable spray device according to the present invention and illustrating an example of embodying a latter art using the portable spray device according to the present invention.

According to the present invention, since it is possible to uniformly spray a powder material without a clog through rotation of a screw included in a nozzle, the material may be used without a problem caused by clogging of the material and convenience in use may be significantly increased.

According to the present invention, since it is possible to freely express and easily decorate letters, patterns, or the like, which are desired by a user, not only on food but also a drink such as coffee and the like by smoothly and uniformly spraying a power material without a cog, expressiveness of the user may be maximized and expressiveness and aesthetic effects of decorating letters or patterns increase may be increased.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

The invention claimed is:

1. A portable spray device comprising:
a body casing member;
a spray nozzle member which is provided at a front end part of the body casing member and comprises a spray hole for spraying a powder material;
a cartridge member which is located in the body casing member and discharges a stored powder material through an outlet and supplies the stored powder material to an inside of the spray nozzle member; and
a spraying rotor which is disposed in the spray nozzle member and sprays the powder material through the spray hole through rotation thereof,
wherein the spraying rotor collides with the cartridge member, which supplies the stored powder material to the spraying rotor, at least once during a single rotation and moves the cartridge member in a longitudinal direction.

2. The portable spray device of claim 1, wherein movement of the cartridge member comprises at least one of upward and downward movement, leftward and rightward movement, regular or irregular movement, and diagonal movement.

3. The portable spray device of claim 1, wherein the outlet is disposed at a front end part of the cartridge member.

4. The portable spray device of claim 1, wherein the spraying rotor comprises:
a rotational shaft portion which receives a rotating force and rotates; and
a spiral protrusion portion which spirally protrudes from an outer circumferential surface of the rotational shaft portion.

5. The portable spray device of claim 4, wherein the spraying rotor further comprises a cartridge-colliding protrusion portion which protrudes from the rotational shaft portion and collides with the cartridge member.

6. The portable spray device of claim 5, wherein a cartridge protrusion portion, which collides with the cartridge-colliding protrusion portion, protrudes from a front end part of the cartridge member.

7. The portable spray device of claim 4, wherein the rotational shaft portion has a conical shape having a diameter gradually decreasing toward a front end part, and
wherein the spiral protrusion portion comprises a plurality of material moving groove portions spaced apart from each other.

8. The portable spray device of claim 7, wherein the spiral protrusion portion has a shape in which a plurality of spiral protrusions are spaced apart from each other and an interval is formed between the spiral protrusions.

9. The portable spray device of claim 1, further comprising a linear movement guide member which guides the movement of the cartridge member.

10. The portable spray device of claim 1, further comprising a cartridge-supporting spring member which elastically supports the cartridge member.

11. The portable spray device of claim 9, wherein the body casing member comprises a rotating motor rotating the spraying rotor, an inner casing portion in which an operation control portion controlling an operation of the rotating motor is mounted, and an outer casing portion in which the inner casing portion is disposed, and
wherein the linear movement guide member comprises:
a main linear moving body provided at any one of a first surface of the inner casing portion facing the cartridge member and a second surface of the cartridge member facing the inner casing portion; and
a main linear movement guide rail provided at the other of the first surface and the second surface and with which the main linear moving body is combined to be linearly movable.

12. The portable spray device of claim 11, further comprising a cartridge-supporting spring member which elastically supports the cartridge member,
wherein the cartridge-supporting spring member is provided in the main linear movement guide rail and elastically supports the cartridge member.

13. The portable spray device of claim 11, wherein the linear movement guide member further comprises:
a movement guide protrusion portion which protrudes from any one of the first surface and the second surface, and
a movement guide slit groove portion which is provided at any one of the first surface and the second surface, into which the movement guide protrusion portion is inserted, and which is disposed in a longitudinal direction of the body casing member.

14. The portable spray device of claim 1, wherein the body casing member comprises a rotating motor rotating the spraying rotor, an inner casing portion in which an operation control portion controlling an operation of the rotating motor is mounted, and an outer casing portion in which the inner casing portion is disposed, and
wherein any one of the inner casing portion and the outer casing portion slides toward the other side and is combined therewith.

15. The portable spray device of claim 1, further comprising a funnel member capable of being utilized to fill the inside of the cartridge member with a powder material.

16. The portable spray device of claim 1, further comprising a spray hole opening or closing member which opens or closes the spray hole.

17. The portable spray device of claim 16, wherein the spray hole opening or closing member comprises:
an electromagnet portion provided at a front end part of the spraying rotor;
a spray hole stopper portion which is moved by a magnetic force of the electromagnet portion and opens or closes the spray hole;
a stopper-supporting spring member which elastically supports the spray hole stopper portion to block the spray hole; and
a stopper movement guide portion which guides movement of the spray hole stopper portion.

18. The portable spray device of claim 17, wherein the electromagnet portion receives electrical power when the rotating motor is operated and generates a magnetic force to open the spray hole, and electrical power supply is blocked when the rotating motor is stopped.

* * * * *